2,875,130

METHOD OF PREPARING SUSTAINED RELEASE PARTICLES AND THE PRODUCT OF THE METHOD

George M. Grass, Jr., Broomall, Pa., and Manford J. Robinson, Moorestown, N. J., assignors to Smith, Kline & French Laboratories, Philadelphia, Pa., a corporation of Pennsylvania No Drawing. Application November 20, 1956
Serial No. 623,311

10 Claims. (Cl. 167—82)

This invention relates to a novel method of preparing sustained release pharmaceutical powders and to the powders prepared by the novel method.

The coating of a medicament with a time delay material is well known to the art. Such coating has been used primarily to provide a medicament with an enteric coating to prevent the release of the medicament until it reached the alkaline portion of the intestine. Relatively large particles of medicament have heretofore been coated using a coating pan technique to provide a sustained release of medicament in the gastrointestinal tract. As contrasted to an enteric coating, a sustained release coated preparation provides a release of medicament over a period of many hours, for example, 8 to 12 hours, with the release normally commencing in the stomach.

The completely coated sustained release particles made by the method of this invention are not over about 100 microns in order that, if desired, they may be suspended in a liquid vehicle. They cannot be prepared by conventional coating techniques such as by using a coating pan. This invention provides a method for making such particles rapidly and accurately without the use of complex and expensive equipment.

In accordance with the method of this invention, a solid medicament is first reduced to a particle size of not in excess of about 10 microns and preferably of from about 1 to 10 microns by any conventional means of comminuting. The thus comminuted particles of medicament are then mixed in from about 5% to about 35% by weight of a liquefied lipid material. The medicament-lipid mixture is solidified and then reduced by, for example, grinding to a powder having a maximum particle size in the range of from about 5 to 25 microns. There are thus formed particles of medicament each having a partial primary lipid coating.

The thus formed powder is given a secondary coating of a lipid material by adding the powder to about 25% to about 85% by weight of a melt of a selected lipid, which is maintained at a temperature below the melting point of the primary lipid coating, mixing the powder-lipid mixture with from about 50% to 400% by weight of water while maintaining the mixture at a temperature of from about the melting point of the secondary coating material and below the melting point of the primary lipid material and agitating moderately. When a substantially complete emulsion has been formed, the mixture is cooled to a temperature below the melting point of the lipid employed to form the secondary coating to precipitate the desired powder. The thus formed powder is collected, for example, by filtration, and dried.

The lipid material employed to form the primary coating will be substantially water insoluble and preferably resistant to disintegration in the gastrointestinal tract. It will have a melting point of above 85° C. Exemplary of primary satisfactory coating materials are wax, such as Acrawax C, carnauba wax, montan wax, chlorowax; a fatty alcohol or amide, such as stearamide, lauramide, myrical alcohol, myristyl alcohol, a glyceride, such as hydrogenated castor oil, glyceryl tri-12-hydroxy stearate. Mixtures having the requirements set forth above may also be used. Exemplary are hydrogenated soy bean oil and ethocel, hydrogenated lard and ethocel, beeswax and ethocel and beeswax and methocel.

The selected lipid material for the primary coating can be liquefied simply by heating and/or by the use of an organic solvent and correspondingly solidified by cooling or evaporating the solvent and then cooling. The solvent may be, for example, carbon tetrachloride, chloroform, trichloroethane, petroleum ether, benzene, toluene, ethyl acetate, xylene, nitrobenzene, acetone, ether, carbon disulfide, methyl ethyl ketone or an aliphatic alcohol such as methyl, ethyl and isopropyl alcohol.

The lipid material employed for forming the secondary coating will be substantially water insoluble, emulsifiable with water and resistant to disintegration in the gastrointestinal tract. In order to prevent melting the primary coating, the lipid material for the secondary coating will have a melting point below, preferably at least 5° C. below, and advantageously about 15° C. below the melting point of the primary lipid material. Exemplary of satisfactory materials for the secondary coating, depending, of course, upon the melting point of the primary coating material, are: wax, such as beeswax, japan wax; a fatty alcohol, such as stearyl alcohol, cetyl alcohol, carnaubyl alcohol, cyryl alcohol; a glyceride, such as glyceryl distearate, glyceryl monostearate, glyceryl trimyristate, hydrogenated lard.

If desired to facilitate forming an emulsion with the secondary coating material in water, emulsifying agents, such as, for example, non-ionics, such as, for example, polyoxyethylene sorbitan monooleate, anionics, such as sodium lauryl sulfate, and gums, such as acacia, gelatin, soaps, lecithin and glyceryl stearate may be added.

Any solid medicament or derivative of a solid medicament which has a melting point higher than the lipid material used to form the secondary coating can be employed in this invention. By way of example, the medicament may be, for example, a sympathomimetic amine such as amphetamine tannate; sulfonamides, such as sulfaethylthiadiazole or sulfamethylthiadiazole; an analgetic, such as aspirin or acetophenitidin; an antibiotic, such as terramycin, tetracycline or chloramphenicol benzoate; an antihistamine, such as thenylpyramine O-(4-hydroxybenzoyl)-benzoate or 1-p-chlorophenyl-2-phenyl-4-pyrrolidino-2-butene-1,5-naphthalene disulfonate; hypnotics, such as amobarbital or phenobarbital, etc.

The powder formed by the method of this invention will be of a size of from about 25 to 100 microns and will have a partial inner coating of lipid material and a complete outer coating of lipid material.

The sustained release powder formed in accordance with this invention can be utilized by adding it in an appropriate amount to cereal or other solid foods. Similarly, it can be suspended in a liquid food such as milk or orange juice.

The sustained release powder of this invention is particularly suited for the formation of aqueous liquid suspensions. An aqueous suspension which will remain substantially uniform over an extended period of time can be made by adding a non-toxic surface active agent which may be an anionic, cationic or non-ionic agent. Exemplary are sodium lauryl sulfate, dioctyl sodium sulfosuccinate, cetyl pyridinium chloride, benzalkonium chloride, glycol monolaurate, polyoxyethylene monostearate, sorbitan mono-oleate. When employed, it is preferred to use surface active agents in an amount of from about 0.25 to 1.0% by weight of the preparation.

Other conventionally used ingredients for liquid preparation may be employed such as lecithin suspending agents, such as montmorillonites, pectins, guar gum, methylcellulose, carboxymethyl cellulose; deflocculating agents, such as sodium hexametaphosphate, sodium lignosulfonate; bulking agents, such as sugars, stearyl alcohol, silicon dioxide and glycerol monostearate. Other pharmaceutical additives may also be added to attain a pharmaceutically elegant preparation; flavorings, such as oil of orange; preservatives, such as parabens, sodium benzoate or sorbic acid; smoothing agents, such as propylene glycol or ammoniated glycyrrhizin.

This invention will be further clarified by the following specific examples:

Example I

Primary powder:

| | |
|---|---|
| Sulfaethylthiadiazole | gm 850 |
| Hydrogenated castor oil | gm 150 |
| Chloroform | ml 1000 |

The chloroform is heated to 55° C. and the hydrogenated castor oil dissolved therein. The sulfaethylthiadiazole is added to the clear solution with agitation. The thoroughly mixed paste is spread on a drying surface and allowed to dry. The solidified mix is then ground in a fluid energy mill to a fine particle size of about 5 microns.

Secondary powder:

| | |
|---|---|
| Primary powder | gm 100 |
| Glyceryl distearate | gm 70 |
| Water | ml 2000 |

The glyceryl distearate is melted and heated to 65° C. The primary powder mix is added with stirring and a careful maintenance of the temperature. The warm mixture is then poured into 2000 ml. of water at 58° C., with moderate agitation. When a complete emulsion has formed, the mixture is allowed to cool below 45° C. The powder is collected by filtration, dried at 45° C., and sieved.

Example II

Primary powder:

| | Gm. |
|---|---|
| Sulaethylthiadiazole | 750 |
| Carnauba wax | 250 |

The wax is melted and heated to 120° C. The sulfaethylthiadiazole is added with good mixing. The homogeneous paste is layered on a surface to dry. The material is ground in a mill to a fine particle size of about 1 micron.

Secondary powder:

| | Gm. |
|---|---|
| Primary powder | 67 |
| Glyceryl distearate | 33 |

The glyceryl distearate is melted and heated to 65° C. The primary powder mix is added with stirring and a careful maintenance of the temperature. The warm mixture is then poured into 2000 ml. of water at 58° C., with moderate agitation. When a complete emulsion has formed, the mixture is allowed to cool below 45° C. The powder is collected by filtration, dried at 45° C., and sieved.

Example III

Primary powder:

| | Gm. |
|---|---|
| Sulfaethylthiadiazole | 170 |
| Beeswax | 26 |
| Ethylcellulose | 4 |

The beeswax is melted and heated to 140° C. The ethylcellulose is added. The mixture is allowed to cool to 120° C., when the drug is added with stirring. The homogeneous paste is dried and ground to a particle size of about 8 microns.

Secondary powder:

| | |
|---|---|
| Primary powder | gm 100 |
| Hydrogenated castor oil | gm 70 |
| Polyoxyethylene sorbitan monooleate | ml 5 |

The wax is melted and heated to 95° C., when the primary powder is added slowly with careful maintenance of temperature. The polyoxyethylene sorbitan monooleate is added. The mixture is poured into 2000 ml. of distilled water at about 90° C. The stirred mixture is passed through a homogenizer, then cooled below 65° C., and collected by filtration. The powder is dried at 60° C., and sieved through a #60 mesh screen.

It is not desired to be limited except as set forth in the following claims.

What is claimed is:

1. The method of preparing a sustained release pharmaceutical powder which comprises reducing a solid medicament to a particle size of a maximum of about 10 microns, mixing the thus formed particles in from about 5% to about 35% by weight of a liquefied lipid material which is substantially water insoluble and has a melting point of above about 85° C., solidifying the thus formed mixture and then reducing the solidified mixture to form a primary powder having a maximum particle size in the range of from about 5 to 25 microns, mixing the thus formed powder with a melt of from about 25% to about 85% by weight of a lipid material which is substantially water insoluble and has a melting point which is a minimum of about 5° C. lower than the melting point of the first mentioned lipid material while maintaining the temperature of the melt below the melting point of the first mentioned lipid material and above the melting point of the second mentioned lipid material, mixing the powder-lipid mixture with water to form an emulsion while maintaining the water-power-lipid mixture at a temperature above the melting point of the second mentioned lipid material and below the melting point of the first mentioned lipid material, cooling the emulsion to a temperature below the melting point of the second mentioned lipid material to precipitate the sustained release pharmaceutical powder, said solid medicament having a melting point higher than the second mentioned lipid material.

2. The method in accordance with claim 1 characterized in that the water contains an emulsifying agent.

3. The method in accordance with claim 2 characterized in that the emulsifying agent is polyoxyethylene sorbitan monooleate.

4. The method in accordance with claim 1 characterized in that the second mentioned lipid material is resistant to disintegration in the gastrointestinal tract.

5. The method in accordance with claim 4 characterized in that the second mentioned lipid material is glyceryl distearate.

6. The method in accordance with claim 1 characterized in that the first mentioned lipid material and the second mentioned lipid material are resistant to disintegration in the gastrointestinal tract.

7. The method in accordance with claim 6 characterized in that the first mentioned lipid material is hydrogenated castor oil.

8. The method in accordance with claim 6 characterized in that the first mentioned lipid material is carnauba wax.

9. The method in accordance with claim 6 characterized in that the water contains an emulsifying agent and that the first mentioned lipid material is hydrogenated castor oil.

10. A sustained release pharmaceutical powder which comprises discrete particles of a solid medicament of a particle size of about 25 to about 100 microns, each of said particles having a partial inner coating of a lipid material which is substantially water insoluble and has a melting point of above about 85° C. and having a complete outer coating of a lipid material which is substantially water insoluble and has a melting point which is a minimum of about 5° C. lower than the melting point of the first mentioned lipid material and which is resistant to disintegration in the gastrointestinal tract, said solid medicament having a melting point higher than the second mentioned lipid material.

References Cited in the file of this patent

UNITED STATES PATENTS

| | | |
|---|---|---|
| 2,544,272 | Miller | Mar. 6, 1951 |
| 2,736,682 | Hermelin | Feb. 28, 1956 |
| 2,805,977 | Robinson et al. | Sept. 10, 1957 |

FOREIGN PATENTS

| | | |
|---|---|---|
| 285,091 | Great Britain | June 10, 1929 |
| 514,047 | Great Britain | Oct. 30, 1939 |

OTHER REFERENCES

Remington's Practice of Pharmacy, 9th ed., Mack Pub. Co., Easton, Pa., 9th ed., 1948, pp. 176, 179 and 182.